United States Patent [19]

De Clippeleir et al.

[11] 4,086,170

[45] Apr. 25, 1978

[54] PROCESS FOR PREPARING OVERBASED CALCIUM SULFONATES

[75] Inventors: Georges De Clippeleir; André Vanderlinden, both of Brussels, Belgium

[73] Assignee: Labofina S. A., Brussels, Belgium

[21] Appl. No.: 764,691

[22] Filed: Feb. 1, 1977

Related U.S. Application Data

[63] Continuation-in-part of Ser. No. 758,155, Jan. 10, 1977, abandoned.

[30] Foreign Application Priority Data

Oct. 8, 1976 Belgium .............................. 171325

[51] Int. Cl.$^2$ .................. C10M 1/40; C10M 3/34; C10M 5/22; C10M 7/38
[52] U.S. Cl. ...................................... 252/33; 252/18

[58] Field of Search .................................. 252/18, 33

[56] References Cited

U.S. PATENT DOCUMENTS

| 2,861,951 | 11/1958 | Carlyle ................................ 252/33 |
| 3,492,230 | 1/1970 | Watson et al. ....................... 252/33 |
| 3,865,737 | 2/1975 | Kemp .................................. 252/33 |

*Primary Examiner*—Delbert E. Gantz
*Assistant Examiner*—Irving Vaughn

[57] ABSTRACT

Overbased calcium sulfonates and concentrated oily solutions thereof are prepared by reacting a solution of alkylbenzene sulfonic acids with an excess of a calcium oxide having a medium or low activity towards water and with carbon dioxide. Oily solutions of overbased calcium sulfonate obtained from such a calcium oxide are perfectly limpid and are easily filtrable.

12 Claims, No Drawings

PROCESS FOR PREPARING OVERBASED CALCIUM SULFONATES

CROSS-REFERENCE TO RELATED APPLICATION

This application is a continuation-in-part of pending application Ser. No. 758,155 filed Jan. 10, 1977, now abandoned.

BACKGROUND OF THE INVENTION

The present invention relates to a process for preparing overbased calcium sulfonates or calcium sulfonates having a high degree of alkalinity.

Within internal combustion engines working under strong load and using fuels which contain sulfur, sometimes in relatively high amounts, serious problems arise, especially with regard to lubrication. The strong acidity produced by the combustion of the fuel induces a corrosion of the engine and an intense oxidation of the lubricating oil which leads to a formation of varnish and sludge.

One preferred way to counteract these detrimental effects is to incorporate a calcium sulfonate having a high degree of alkalinity into the lubricating oil.

The detergent effect of the calcium sulfonates is well known for a long time, and, U.S. Pat. No. 2,270,577 may be cited as reference in this field.

The degree of alkalinity or in other words the potential alkalinity of the calcium sulfonate serves to neutralize the strong acidity to which the lubricating oil is exposed during its use and to avoid or at least to strongly reduce the detrimental effects of that acidity. This action of overbased sulfonates is also known for a long time (see for instance U.S. Pat. Nos. 2,418,894; 2,402,325; 2,485,861 and 2,501,731).

In general the process of preparing oils which contain overbased calcium sulfonates essentially consists of reacting a solution of alkylbenzene sulfonic acids having a molecular weight higher than 400, in oil with calcium oxide or hydroxide and bubbling carbon dioxide through the reaction mixture; thereby an incorporation of an excess of calcium carbonate into the calcium sulfonate is effected which confers to the product a potential alkalinity.

The first products which were obtained in this manner had only a low potential of alkalinity; moreover, they formed more or less cloudy solutions which were difficult to filter because they caused clogging of the filters. Thereafter, the methods have been improved and the potential of alkalinity could be increased up to values sometimes reaching 400 mg KOH/g. Nevertheless, the problems which are encountered during the filtration of these products remains the most limiting factor of their preparation. The efforts to improve that filtration have been obviously directed to additives which can improve the reaction of carbon dioxide with calcium oxide or hydroxide. For this purpose alcohols, amines or ammonia are frequently added to the reaction mixture. It has also been thought that the difficulties of filtration could be due to impurities of the calcium oxide, which are present in the commercial quicklime. Therefore it has also been tried to use quicklimes as reactive as possible. However, these different factors have only a small influence on the filtration step which remains the most critical step of the process.

SUMMARY OF THE INVENTION

It is an object of the present invention to provide a process for preparing overbased calcium sulfonates and oily solutions thereof which allows remedying of the above-mentioned disadvantages.

Another object of the present invention is to provide a process for producing overbased calcium sulfonates having a high degree of alkalinity.

It is a further object of this invention to provide a process for producing overbased calcium sulfonate, which forms limpid solutions in organic solvents and/or lubricating oils. It is a further object of the present invention to provide a process for producing concentrated solutions of overbased calcium sulfonates in lubricating oil and/or organic compounds, which exhibit a high degree of alkalinity. It is a special object of the present invention to provide a process for producing such solutions of overbased calcium sulfonates, which are easily filtrable without clogging the filters and which preferably are limpid.

Within the present invention overbased calcium sulfonates or calcium sulfonates having a high degree of alkalinity are understood to be alkaline reaction products resulting from the reaction of sulfonic acids in an excess of calcium oxide and carbon dioxide.

In order to accomplish the foregoing objects according to the present invention there is provided a process which comprises the steps of reacting at least one alkyl benzene sulfonic acid the alkyl group of which has an average molecular weight of about 290 to about 2000 with an excess of a calcium oxide having a medium activity towards water and subsequently treating the reaction product with gaseous carbon dioxide.

According to a preferred embodiment of the invention a solution of the alkyl benzene sulfonic acids in an organic solvent comprising a mineral oil is reacted with the calcium oxide, then carbon dioxide is passed through the reaction mixture, and subsequently any insoluble impurities, e.g., insoluble calcium carbonates are removed from the reaction mixture, e.g., by filtration or centrifugation and a concentrated solution of overbased calcium sulfonates in oil is recovered.

DETAILED DESCRIPTION OF THE INVENTION

The preparation of oily concentrates of calcium sulfonates having a high degree of alkalinity, usually called overbased calcium sulfonates, has been described in the literature and in various patents. This preparation comprises using a mixture containing sulfonic acid, an oil, sometimes an aromatic diluent such as benzene or toluene, calcium oxide or hydroxide, an oxygenated solvent such as methanol, ethanol or even glycol and other additives such as ammonia and amines more or less hydrated which serve to optimize the absorption of carbonic acid which bubbles through the mixture. When the absorption of carbon dioxide is complete, the volatile solvents and additives are distilled off and the overbased sulfonate is filtered. This latter operation is usually very difficult when the desired alkalinities are high, as for instance in the order of 300 mg KOH/g.

We have now unexpectedly found that calcium oxide having a medium reactivity towards water, e.g., as measured according to the ASTM-C-110 method, that's to say a lower reactivity than that of quicklimes or commercial calcium oxides, allows preparation of calcium sulfonates having a high degree of alkalinity, for instance higher than 300 mg KOH/g, the oily solutions of which are perfectly limpid and easily filtrable.

Such a calcium oxide is easily obtained by extending the roasting time of the limestone or by carrying out this roasting at a temperature which is much higher than that which is usually required for the complete conversion of the limestone into calcium oxide. When an oily solution of overbased calcium sulfonates is prepared preferably the solvent which is used to prepare the starting solution of alkyl benzene sulfonic acids further comprises oxygen-containing solvents, preferably lower mono- or divalent alcohols, e.g., methanol, ethanol or the like and/or aromatic solvent, e.g., benzene or toluene. We have found that a small amount of water in methanol optimizes the reaction between calcium oxide and carbon dioxide, but if the calcium oxide is highly reactive towards water, it tends to agglomerate, thus reducing its surface area which is available for the contact with carbon dioxide. Whereas when a calcium oxide having a medium reactivity towards water is used under the same conditions it remains finely suspended in the mixture and it absorbs the carbon dioxide easily. Further to the above mentioned solvents, alkaline additives which are removable by evaporation and/or do not form insoluble products such as ammonia or organic amines may be added during the reaction. The volatile solvents and other additives are removed by distillation after the reaction is completed. After evaporation of the solvents and additives, the concentrated oily solution of overbased sulfonates which is obtained from the calcium oxide having a medium reactivity to water is easily filtrable and has a high degree of alkalinity whereas oily solutions of calcium sulfonates which are obtained from a calcium oxide highly reactive to water have a lower degree of alkalinity, and their filtration is difficult or even impossible.

The reactivity to water of the calcium oxide is measured according to the ASTM-C 110-67 method (Physical testing of quicklime and hydrated lime-slaking rate of quicklime), the disclosure of which is hereby incorporated by reference, and which essentially consists in hydrating quicklime or calcium oxide and determining the temperature variation during that exothermal hydration reaction and tracing a curve of the reaction temperature relative to the reaction time. The activity of calcium oxide is characterized according to this method by the total reaction period, and the degree of temperature rise after 30 seconds expressed as percent of the total temperature rise. The calcium oxide or quicklime, which is used according to the process of the invention, has a reactivity measured in accordance with this ASTM method, which is characterized by a total reaction period of between about 8 and about 25 minutes, and advantageously between about 10 and about 20 minutes; thus, the calcium oxide is one of medium reactivity. The commercial calcium oxides are oxides having a high reactivity characterized by a total reaction period which does not exceed 10 minutes.

For a calcium oxide having a medium reactivity, the temperature rise after 30 seconds, expressed in percent of the total temperature rise, is comprised between about 15 and about 45%, and advantageously between about 25 and 35%. The data for calcium oxide activity referred to in the specification of the present invention are data which are determined according to the ASTM-C 110 method on calcium oxide samples previously heated at 700° C. during 1 hour.

This range of the reactivity of the calcium oxide is a particularly important feature; the chemical purity and the degree of fineness of the oxide granules play a less critical role. Generally a calcium oxide of good quality and which is carefully roasted in order that its reactivity be medium, is perfectly convenient for the process of the invention.

However, in order not to have to use an excess of calcium oxide and in order to obtain an overbased sulfonate of good quality, it is advantageous to use the calcium oxide in the form of a powder as fine as possible, e.g., a powder having a maximum oversize of 35%, based on the total, on an ASTM 400 mesh sieve, and having a CaO content of at least b 92%.

The calcium oxide which is preferably used, fulfills the following specifications:

CaO: minimum 92%
$CO_2$: maximum 1%
$SiO_2$: maximum 1.7%
MgO: maximum 1.4%
S: maximum 0.02%
$Fe_2O_3$: maximum 1.5%
Ignition loss: maximum 1.5%

The sulfonic acids which are used within the present invention are sulfonic acids, the alkyl group of which has an average molecular weight of about 250 to about 2000, which corresponds to a total molecular weight of the sulfonic acid of about 400 to about 2150. The most convenient acids for preparing a calcium sulfonate having a high degree of alkalinity have a molecular weight which does not exceed about 650 and which is advantageously comprised between about 480 and about 580. The alkyl group may be straight or branched and may be of the polypropylene or poly-n-butene type; the polyisobutylene structure is to be avoided.

The sulfonic acids are obtained in the conventional manner by sulfonating an alkylbenzene which usually is a mixture of alkylbenzenes of the hereinabove described type, with oleum or with sulfuric anhydride, preferably in the presence of an inert solvent, such as for instance hexane. After sulfonation and mere decantation of the acidic sludges, the sulfonic acids are not pure enough for the manufacture of overbased calcium sulfonates having a high degree of alkalinity: indeed, they contain a percentage of free sulfuric acid and of sulfonic acids of lower molecular weight which are even more disturbing. The sulfuric acid content includes difficulties during the filtration of oily solutions of overbased calcium sulfonates which are prepared from such raw sulfonic acid mixture. Moreover, these calcium sulfonates contaminated with calcium sulfate give poor results as corrosion inhibiting and detergent agents in internal combustion engines.

Thus, a purified alkylbenzene sulfonic acid is preferably used, that is to say an acid which is free from sulfuric acid. A method for removing sulfuric acid consists in carrying out an extraction of the free sulfuric acid by water, in the presence of an organic oxygenated solvent (French Pat. No. 1,478,530). Another purification method is described in applicants' U.S. Pat. No. 3,720,707, the disclosure of which is hereby incorporated by reference. According to this method, the free sulfuric acid is neutralized with an excess of ammonia and converted into ammonium bisulfate, which is easily separated by filtration or centrifugation. The excess of ammonia neutralizes about 20% of the alkylbenzene sulfonic acid, but a benzene sulfonic acid containing some ammonium alkylbenzene sulfonate is perfectly convenient for preparing overbased calcium sulfonates according to the process of the invention. Another purification method of sulfonic acids consists of using such an amount of calcium hydroxide which stoichiometrically neutralizes the free sulfuric acid which is present in the mixture, and thereafter separating the formed calcium sulfate by filtration (U.S. Pat. No. 3,476,800). The major drawback of this process resides in the fact that the exact amount of sulfuric acid present in the mixture must be known, in order to calculate the amount of calcium hydroxide to be used, indeed, any excess of calcium hydroxide results in a partial neutralization of the sulfonic acid, and thus, increases its ash content. Another purification method consists of reacting the free sulfuric acid with calcium oxide and thereafter eliminating the formed calcium sulfate by filtration or centrifugation. The advantage of this method with regard to the preceeding is that the calcium oxide does not react with the sulfonic acids at the temperatures where this purification is carried out and thus the calcium oxide may thus be used in excess without any drawback. An embodiment of this purification process is described beneath in Part A of the Example.

The purified alkylbenzene sulfonic acid, which is generally diluted with a mineral oil, is reacted with the calcium oxide of medium reactivity such as hereinabove defined and carbon dioxide is then bubbled through the mixture, to confer to the final product its potential of alkalinity or its overalkalization. We have found that this overalkalization as well as the filtration of the overbased sulfonate solution are made easy when, first, the bubbling through of the carbon dioxide and, thereafter, the evaporation of the solvents are carried out in an alkaline medium. In order to obtain this alkaline medium, any basic compound which does not form insoluble products and/or is removable by evaporation, may be added, such as for instance ammonia or organic bases, typically mono- or diamines such as ethylenediamine. The selection of this basic compound principally depends on economic conditions, and therefore, ammonia is advantageously used. The above mentioned solvents may be used during the overalkalization. By way of example, the solvent may consist of a mixture comprising a lower aliphatic alcohol such as methanol, ethanol or isopropanol, low amounts of water and an aromatic hydrocarbon, typically benzene, toluene and xylene.

It should be understood that various modifications of the hereinabove described process will be apparent for one skilled in the art upon reading this description, but it should be understood that these modifications are contained within the scope of the present invention.

The invention will now be described by the following example which is intended to be illustrative only and not in any sense limitative of the invention.

EXAMPLE

Part A — Preparation and Purification of The Sulfonic Acid

An alkylbenzene obtained from poly-n-butene and benzene is used as starting material.
This alkylbenzene has the following characteristics:
Specific gravity 15/4° C.: 0.870
Viscosity at 100° F. (Cst): 154.5
Viscosity at 210° F. (Cst): 10.46
Flash point Cleveland (° C.): 218
Refractive index $n_D^{20}$: 1.4827
Average molecular weight: 475

5 kg of this alkylbenzene are diluted, at room temperature, with 5 kg hexane and thereafter 5.5 kg (110% by weight) of oleum containing 20% of $SO_3$ are added to the mixture. The temperature rises to about 55° C. and is maintained at this value by indirect cooling. After the addition of the oleum, the mixture is stirred during 3 minutes, and thereafter 640 ml water are added, while maintaining the temperature at 55° C. Then the acidic sludges are separated from the mixture, and 10.5 kg of a diluted mixture of sulfonic acids having an average molecular weight of 555 are thus obtained.

These 10.5 kg of the diluted mixture of sulfonic acids are introduced into a vessel fitted with a reflux condenser and 210 g (2%) of a commercial calcium oxide are added while stirring. The mixture is heated to reflux temperature, that is to about 68° C. After 2 hours, the mixture is cooled and centrifuged. Hexane is then evaporated and a mixture of sulfonic acids having the following characteristics is thus obtained:
Alkylbenzene sulfonic acid content: 87%
Acidity (milliequivalent/g): 1.28
Viscosity at 210° F. (cst): 48.37

Part B — Preparation of Overbased Calcium Sulfonates

These sulfonic acids are diluted with a mineral oil (tradename "Solvent Neutral") having a viscosity of 100 SSU at 100° F. in order to obtain a 39% active substance content in the mixture. To 1 kg of this solution (containing 0.71 mole of sulfonic acid having an average molecular weight of 555), 300 g of toluene and 183 g of methanol containing 12.3% by weight water are added. The mixture is heated and when a temperature of 30° C. is reached, 44 g (0.78 mole) of calcium oxide with a medium reactivity are added.

This calcium oxide has the following characteristics according to the ASTM-C 110 method:
Total reaction time: 15 minutes.
Ratio temperature rise in 30 seconds/total temperature rise: 29.41%.

The mixture is further heated to reflux temperature, that is to about 67° C. This temperature is maintained during 15 minutes. Thereafter 580 g toluol are added and the mixture is cooled to about 45° C.

Then, 312 g (5.57 moles) of calcium oxide of the same quality are added. Then there are bubbled through the mixture, first 4.4 g ammonia at a rate of 1 g per minute, thereafter 171 g carbon dioxide at a rate of 0.55 liter per minute, thereafter 10 g ammonia at a rate of 1 g per minute, while always maintaining the temperature near 45° C. Thereafter, the solvents are evaporated by progressively heating the mixture up to 160° C., and nitrogen is bubbled through the mixture at this temperature.

Thereafter, 8% by weight of coarse grained diatomeous earth are added and the mixture is filtered on a Buechner filter loaded with coarse grained diatomeous earth. An amount of 550 g is filtered within 6 minutes on a filter of 11.5 cm diameter without any tendency to clogging. The filtered product is perfectly limpid to the eye, even as a 10 cm thick layer. Its other characteristics are the following:
Viscosity at 210° F. (cst): 65
Neutral calcium sulfonate (%): 28
Calcium carbonate (%): 23
Calcium (%): 12
Oil (%): 49
Alkalinity mg KOH/g: 320
Molecular weight of the sulfonic acid: 555

Other experiments which are carried out with calcium oxide samples from different origins but of medium activity towards water (total reaction time between 8 and 25 minutes and temperature rise ratio between 15 and 45%, according to the ASTM-C 110 method), always yield easily filtrable products having a high degree of alkalinity. The best results with regard to these characteristics and limpidity have been obtained with calcium oxide of an activity towards water characterized by a reaction time between 10 and 20 minutes and a temperature rise ratio between 25 and 35%.

By way of compression, the embodiment hereinabove described is repeated but by using in Part B, a highly active commercial calcium oxide or quicklime having a total reaction time to water of 6.5 minutes and a temperature rise ratio of 75.2%. It has been noted that this calcium oxide although it is very fine, is more poorly dispersed than the medium active calcium oxides. During the filtration, the filter is clogged after 3 minutes and only 53 g of a product which is not perfectly limpid are removed. However, its alkalinity is also 320 mg KOH/g.

Various other experiments which are carried out under similar conditions with calcium oxides from different origins and having a total reaction time to water lower than 8 minutes, in accordance with the ASTM method, always lead to products, the filtration of which is difficult or impossible.

These different experiments illustrate the favorable and quite unexpected effect which the use of a calcium oxide of reduced activity towards water has in facilitating the filtration of an oily solution of overbased calcium sulfonates prepared therefrom.

What is claimed is:

1. A process for preparing overbased calcium sulfonates having a high degree of alkalinity, which comprises the steps of:
   (a) reacting a solution of at least one alkyl benzene sulfonic acid the alkyl group of which has an average molecular weight of about 250 to about 2000 in an organic solvent comprising a mineral oil with an excess of a calcium oxide, having a medium reactivity towards water, which is characterized by a total reaction time of about 8 to about 25 minutes and a ratio of temperature rise after 30 seconds of hydration to total temperature rise of about 15 to about 45%, to form a reaction mixture
   (b) reacting said reaction mixture with gaseous carbon dioxide, and
   (c) filtering said reaction mixture to obtain a concentrated oily solution containing overbased calcium sulfonate.

2. The process as defined by claim 1, wherein the calcium oxide exhibits an activity towards water which is characterized by a total reaction time of about 10 to about 20 minutes and a temperature rise ratio of about 25 to about 35%.

3. The process as defined by claim 1, wherein said solvent further comprises an aromatic hydrocarbon.

4. The process as defined by claim 1, wherein said solvent further comprises a lower aliphatic alcohol.

5. The process as defined by claim 1, wherein said solvent comprises a mixture of an aromatic hydrocarbon, a lower aliphatic alcohol and water.

6. The process as defined by claim 1, wherein said step (b) further comprises adding a basic compound of the group of ammonia and an organic mono- or diamine.

7. The process as defined by claim 6, wherein ammonia and carbon dioxide are alternatively bubbled through the reaction mixture.

8. The process as defined by claim 1, wherein the alkyl benzene sulfonic acid is essentially free of sulfuric acid.

9. The process as defined by claim 8, wherein the alkylbenzene sulfonic acid is freed from residual sulfuric acid by treatment with ammonia and elimination of the formed ammonium bisulfate.

10. The process as defined by claim 8, wherein the alkylbenzene sulfonic acid is freed from residual sulfuric acid by treatment with calcium oxide and elimination of the calcium sulfate.

11. Overbased calcium sulfonates which are obtained according to the process as defined in claim 1.

12. A concentrated oily solution of overbased calcium sulfonates which is obtained according to the process as defined in claim 1.

* * * * *